Figure 1:
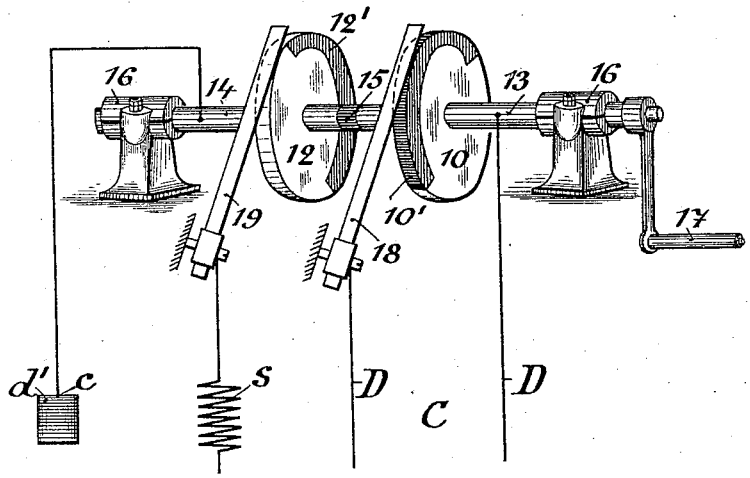

(No Model.)  2 Sheets—Sheet 1.

O. FRÖLICH.
APPARATUS FOR DETERMINING ELECTRICAL RESISTANCES CONTAINING ELECTROMOTIVE FORCES.

No. 575,767. Patented Jan. 26, 1897.

WITNESSES:  
J Smigg Poole  
B. C. Pole

BY ATTORNEY:

INVENTOR:  
Oscar Frölich.  
Herbert W. Jenner.

(No Model.) 2 Sheets—Sheet 2.
O. FROLICH.
APPARATUS FOR DETERMINING ELECTRICAL RESISTANCES CONTAINING ELECTROMOTIVE FORCES.
No. 575,767. Patented Jan. 26, 1897.
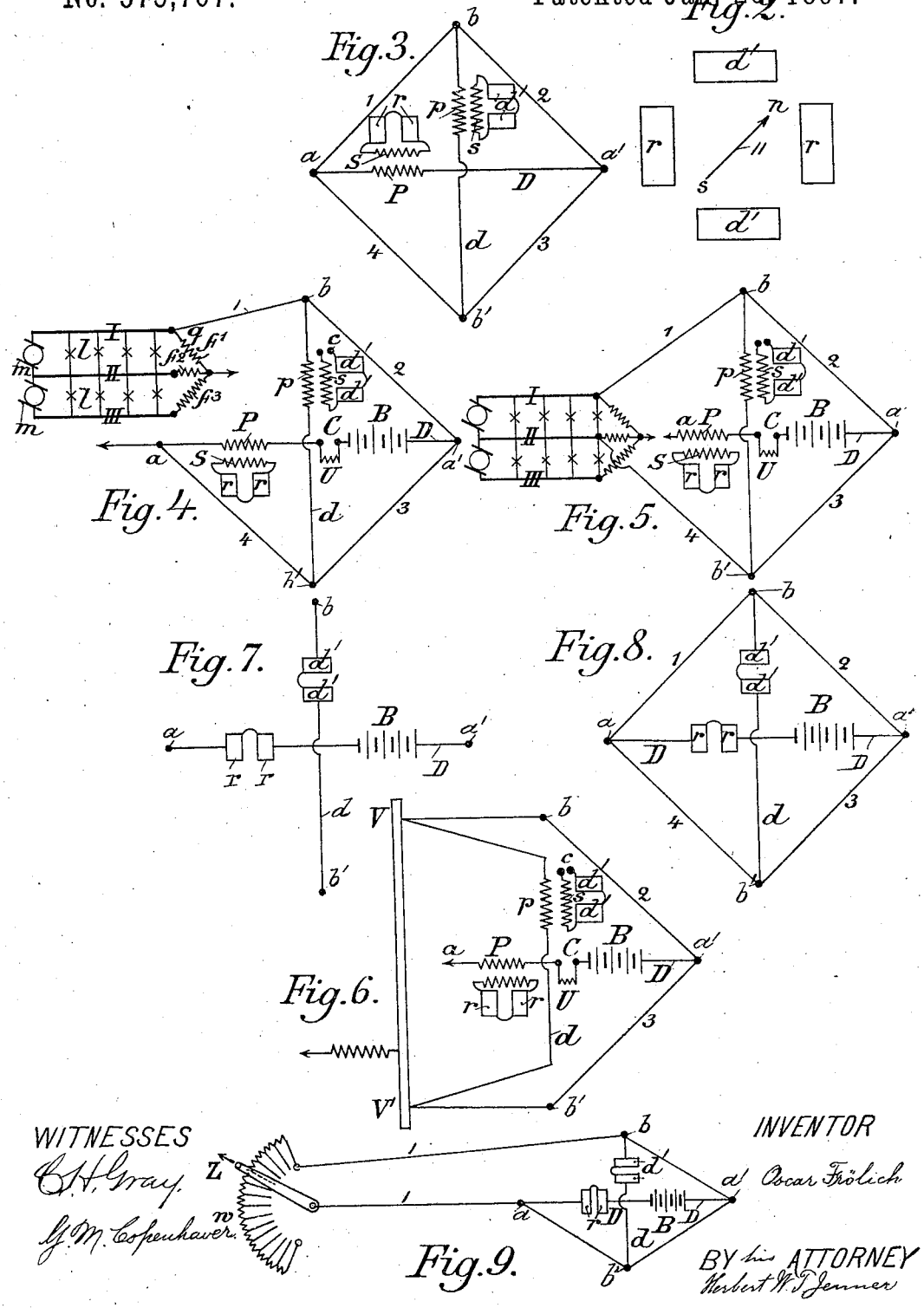
WITNESSES
C. H. Gray
G. M. Copenhaver
INVENTOR
Oscar Frölich
BY his ATTORNEY
Herbert W. T. Jenner

UNITED STATES PATENT OFFICE.

OSCAR FRÖLICH, OF CHARLOTTENBURG, GERMANY, ASSIGNOR TO SIEMENS & HALSKE, OF BERLIN, GERMANY.

APPARATUS FOR DETERMINING ELECTRICAL RESISTANCES CONTAINING ELECTROMOTIVE FORCES.

SPECIFICATION forming part of Letters Patent No. 575,767, dated January 26, 1897.

Application filed May 11, 1895. Serial No. 548,924. (No model.) Patented in Germany September 12, 1894, No. 83,284; in France April 11, 1895, No. 246,568; in Austria April 12, 1895, No. 46/1,145; in England May 3, 1895, No. 8,810, and in Hungary June 6, 1895, No. 3,555.

*To all whom it may concern:*

Be it known that I, OSCAR FRÖLICH, a citizen of the Republic of Switzerland, residing at Charlottenburg, in the Kingdom of Prussia, and German Empire, have invented certain new and useful Improvements in Methods of Determining Electrical Resistances Containing Electromotive Forces, (for which I have obtained patents as follows: in Germany, No. 83,284, dated September 12, 1894; in England, No. 8,810, dated May 3, 1995; in France, No. 246,568, dated April 11, 1895; in Austria, No. 46/1,145, dated April 12, 1895, and in Hungary, No. 3,555, dated June 6, 1895;) and I do hereby declare the following to be a full, clear, and exact description of the invention, such as will enable others skilled in the art to which it appertains to make and use the same.

This invention relates to systems for measuring electrical resistances containing electromotive forces; and it consists in the novel system and combination of parts hereinafter fully described and claimed.

In the drawings, Figure 1 is a perspective view showing the switches for interrupting the currents in the diagonal branches of the bridge system. Fig. 2 is a diagram of a galvanometer-needle and the coils for operating it. Fig. 3 is a diagram of a Wheatstone-bridge system provided with galvanometer-coils operated by induced currents. Fig. 4 is a diagram showing the novel bridge system applied to test the insulation of an electric-lighting plant. Fig. 5 is a diagram showing the novel bridge system applied to test the insulation of part of an electric-lighting plant. Fig. 6 is a diagram showing the novel bridge system applied to detect a leak in a wire. Figs. 7 and 8 are diagrams showing modifications of the novel bridge system. Fig. 9 is a diagram showing the novel bridge system applied to indicate the position of the hand of an instrument.

In carrying out this invention a bridge system of approved construction is used, such as that known as the "Wheatstone" bridge. This bridge system comprises four lateral branches 1, 2, 3, and 4 and two diagonal branches D and $d$. Branch 1 extends between points $a$ and $b$, branch 2 between points $b$ and $a'$, branch 3 between points $a'$ and $b'$, and branch 4 between points $b'$ and $a$. The diagonal branch D extends between the points $a$ and $a'$ and the diagonal branch $d$ between the points $b$ and $b'$.

In carrying out this invention, as shown in Fig. 4, B is an electromotive force, such as a battery, inserted in the diagonal branch D, and P is a primary coil also inserted in the said branch. U is a resistance also inserted in the branch D at the point C between the battery B and the coil P. At the point C a switch 10 is also inserted in the branch D. This switch is of any approved construction, such as shown in Fig. 1, and is hereinafter more fully described. S is a secondary coil arranged adjacent to the primary coil P and connected to the double coil $r$. A primary coil $p$ is included in the diagonal branch $d$. A secondary coil $s$ is arranged adjacent to the primary coil $p$ and is connected to the double coil $d'$. The coils $r$ and $d'$ are arranged as shown in Fig. 2, and 11 is a galvanometer-needle suspended between the said coils and operated by them. A switch 12 is inserted in the circuit at $c$ between the secondary coil $s$ and the coils $d'$. The switch 12 may be of any approved construction, such as is shown in Fig. 1.

The switch 10 is shown as a disk provided with a segment 10' of insulating material, and the switch 12 is also shown as a disk provided with a segment 12' of insulating material. The switch 10 is secured on a shaft 13, and the switch 12 is secured on a shaft 14. The two shafts 13 and 14 are connected together by a coupling 15 of insulating material, and are journaled in bearings 16 and provided with means for revolving them, such as a crank 17. The segments 10' and 12' are arranged on opposite sides of their respective disks, so that the currents are broken alternately. A brush or tongue 18 bears on the switch-disk 10 and is connected to one portion of the diagonal branch D, the other portion of the said branch being connected to the shaft 13.

A branch or tongue 19 bears on the switch-disk 12 and is connected to the coil $s$, and the coil $d'$ is connected to the shaft 14.

The switches make and break the current through the branches in which they are inserted and constitute a means for causing variations in the current flowing through the said branches.

The resistance to be measured is inserted in one of the lateral branches of the bridge system.

In Fig. 4 a three-wire-system electric-lighting plant is shown inserted in the branch 1, the point $a$ being connected with earth and the branch 1 being connected with the wire I at $q$. II and III are the other wires of the said lighting plant. $m$ are the electricity-generators, and $l$ are the lamps. The leaks or resistances $f'$ $f^2$ $f^3$ are shown as coming between the wires I, II, and III and earth. The earth connections are indicated by arrowheads.

The deflection of the galvanometer-needle will be altered according to whether the currents flowing through the coils $r$ and $d'$ are synchronous or are subject to a difference of phase.

Other equivalent measuring devices besides a galvanometer may be used, such as an electrodynamometer of approved construction provided with a swinging coil.

The resistance can be calculated mathematically from the observed deflection of the galvanometer-needle.

In order to find the resistance of any one wire I of a lighting plant, the point $a$ at one end of the diagonal branch D is connected to earth, as shown in Fig. 5, and the lateral branches 1 and 4 are connected with the wires I and II, respectively. The wires II and III are then connected with the said branches 1 and 4 in a similar manner, and afterward the branches III and I. The deflections of the galvanometer-needle under these three connections are observed separately, and the resistance of each single wire can be calculated from the amount of the total resistance and the three resistances thus observed.

In Fig. 6, V and V' are points in a wire between which there is a leak which it is desired to locate. The point $a$ is connected to earth, the branch 1 is connected to V, and the branch 4 to V'. The diagonal branch $d$ is also connected to the wire at the points V and V'. The deflection of the galvanometer-needle will be a measure of the value of the relation between the resistances at V and at V'.

In alternating-current circuits the transformers and switches can be dispensed with, as shown in Fig. 7, the galvanometer-coils $r$ and $d'$ being inserted directly in the diagonal branches D and $d'$, and when no electromotive forces are present in the lateral branches, as illustrated in Fig. 8, this same arrangement can be employed, and the deflection of the galvanometer-needle will then measure the resistance in a lateral branch, such as 1.

In Fig. 9, Z is the hand of an instrument, and $w$ is a rheostat under it. The said hand and rheostat are included in the branch 1, and the deflection of the galvanometer-needle will then indicate the position of the hand Z.

Having now particularly described and ascertained the nature of the said invention and in what manner the same is to be performed, it is declared that what I claim is—

1. In a system for measuring an electrical resistance combined with an electromotive force acting therein, the combination with a Wheatstone-bridge system including the said resistance in one of its lateral branches, of means for causing variations in the current flowing through one of the diagonal branches of the said bridge system, and means for measuring the ratio of the variations of the current in the two diagonal branches, substantially as set forth.

2. In a system for measuring an electrical resistance combined with an electromotive force acting therein, the combination with a Wheatstone-bridge system including the said resistance in one of its lateral branches, of means for causing variations in the current flowing through one of the diagonal branches of the said bridge system, two coils operatively connected with the respective diagonal branches, and an indicating device such as a galvanometer-needle controlled by the said two coils, substantially as set forth.

3. In a system for measuring an electrical resistance combined with an electromotive force acting therein, the combination with a Wheatstone-bridge system including the said resistance in one of its lateral branches, of a switch C and a resistance U for causing variations in the current flowing through one of the diagonal branches of the said bridge system, two primary coils P and $p$ included in the respective diagonal branches, two secondary coils S and $s$ operatively arranged with respect to the said primary coils, a switch $c$ in circuit with the coil $s$ and moving isochronously with the switch C, coils $r$ and $d'$ included in circuit with the coils S and $s$ respectively, and a galvanometer-needle controlled by the said coils $r$ and $d'$, substantially as set forth.

In testimony whereof I have affixed my signature in presence of two witnesses.

OSCAR FROLICH.

Witnesses:
EMIL KOLLINER,
MAX WAGNER.